United States Patent [19]

Takano et al.

[11] 4,121,078

[45] Oct. 17, 1978

[54] MICROWAVE HEATING APPARATUS

[75] Inventors: Teruhisa Takano, Osaka; Noboru Kurata, Nara; Shigeru Kusunoki, Yamatokoriyama; Hirofumi Yoshimura, Nara, all of Japan

[73] Assignee: Matsushita Electric Industrial Co., Ltd., Kadoma, Japan

[21] Appl. No.: 680,809

[22] Filed: Apr. 27, 1976

[30] Foreign Application Priority Data

| Apr. 30, 1975 | [JP] | Japan | 50-52974 |
| Apr. 30, 1975 | [JP] | Japan | 50-52977 |
| May 7, 1975 | [JP] | Japan | 50-54981 |

[51] Int. Cl.$^2$ ............................................. H05B 9/06
[52] U.S. Cl. ........................ 219/10.55 F; 219/10.55 E
[58] Field of Search ............... 219/10.55 F, 10.55 E, 219/10.55 A, 10.55 R

[56] References Cited

U.S. PATENT DOCUMENTS

| 3,478,187 | 11/1969 | Agdur et al. | 219/10.55 F |
| 3,626,135 | 12/1971 | Fitzmayer | 219/10.55 F |
| 3,810,248 | 5/1974 | Risman et al. | 219/10.55 F |
| 3,885,118 | 5/1975 | Valtersson | 219/10.55 F |
| 4,019,009 | 4/1977 | Kusunoki et al. | 219/10.55 F |

FOREIGN PATENT DOCUMENTS

| 676,266 | 6/1966 | Belgium | 219/10.55 F |
| 412,144 | 11/1966 | Switzerland | 219/10.55 F |
| 1,126,876 | 9/1968 | United Kingdom | 219/10.55 F |

*Primary Examiner*—Arthur T. Grimley

[57] ABSTRACT

Microwave heating apparatus employing at least one surface waveguide which is provided in a lower portion of the apparatus below an article to be heated receives microwave output, directly or via a tubular waveguide, from an oscillator means, and acts to concentrate microwave energy in a specific region of the apparatus, whereby heating is rendered more efficient and unevenness of heating in the vertical plane is avoided. For improved evenness of heating in the horizontal plane the surface waveguide may be rotated either by separate drive means or by air supplied to cool the oscillator means, or the article to be heated may be rotated or moved reciprocally while the surface waveguide is moving or is stationary. The improved concentration of microwave energy permits greater economy, and offers a particular advantage for producing highly a baked or hardened outer surface without overheating of other portions of an article to be heated.

21 Claims, 34 Drawing Figures

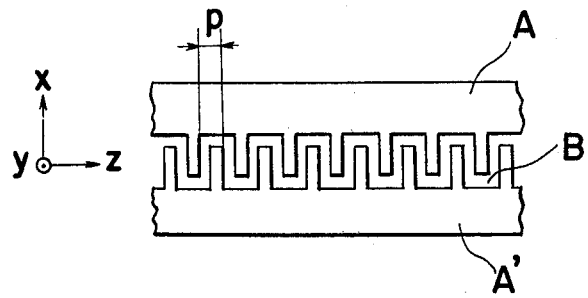
FIG. 1(a) (PRIOR ART)
FIG. 1(b) (PRIOR ART)
FIG. 1(c) (PRIOR ART)
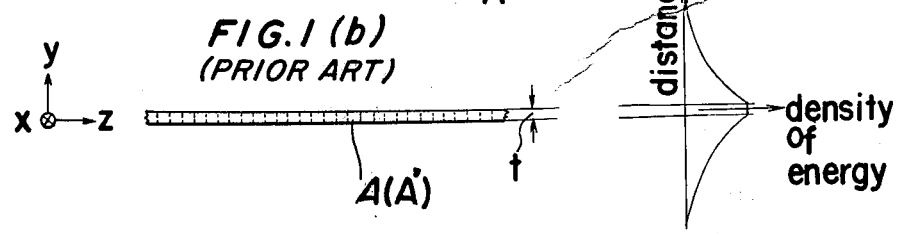
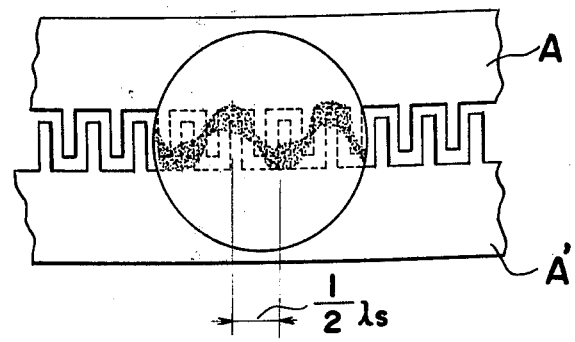
FIG. 2 (PRIOR ART)
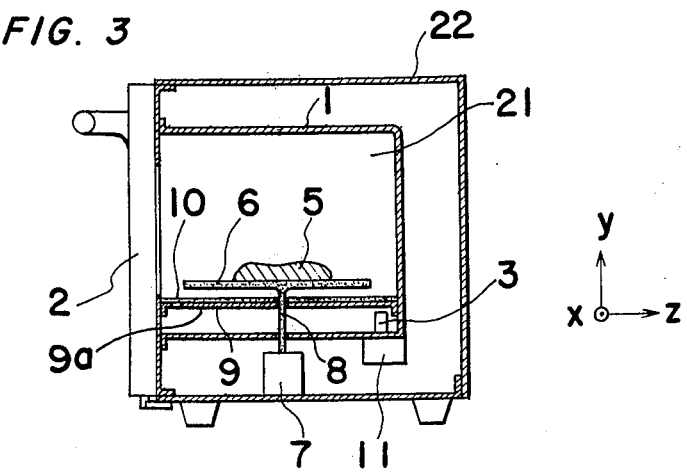
FIG. 3

MICROWAVE HEATING APPARATUS

The present invention relates to a microwave heating apparatus. More particularly the invention relates to a microwave heating apparatus permitting even heating of objects to be heated and employing surface wave guide means.

Conventionally in a microwave heating apparatus, such as an oven for baking or cooking food, high-frequency waves emitted by a magnetron or similar source are directed by a tubular wave guide of rectangular or circular cross-section into a heating chamber in which food to be cooked is placed and are reflected from the walls of the chamber whereby there are produced standing waves the energy of which is converted to heat to cook the food. A particular disadvantage with this type of heating is that there is established a three-dimensional pattern of 'high-spots', that is points or regions at which the density of energy produced is greater than the average density of energy in the heating chamber as a whole, this pattern varying depending on the size or type of article of food to be cooked, with the result that it is difficult to ensure even heating of an article of food, which may therefore be overcooked or even burnt in some portions but undercooked in others. It has been attempted heretofore to overcome this disadvantage by provision in the heating chamber of a stirrer means which is actuated in order to produce a more even distribution of microwave energy in the heating chamber. However, it has been found that such stirrer means is ineffective, one reason being that cooking of food in a microwave oven needs essentially a uniform heating and effecting even distribution of microwave energy by convection is comparatively equalized. Alternatively, it has been known to provide a rotary table on which food to be cooked is placed and which is rotated while heating takes place. However, since such rotation takes place in a single plane, and since the high-spot pattern is three-dimensional, even if the effect of high-spots along two orthogonal axes is made more even, the rotation is ineffective in rendering heating in planes parallel to the plane of rotation more even.

Another disadvantage in the conventional microwave heating apparatus is that since an antenna, i.e., the output loop of a magnetron or similar source is placed directly in a heating chamber or microwaves are led into the heating chamber by a tubular waveguide, load conditions of the magnetron are directly affected by the shape and dielectric properties of a heated article, which are variable, with consequent adverse effect on oscillation efficiency. Another disadvantage with the conventional heating apparatus is that because microwave energy is distributed throughout the whole heating chamber heating is inefficient and is unduly expensive, particularly when an article to be heated is comparatively small.

It is accordingly an object of the present invention to provide a microwave heating apparatus wherein an effectively even distribution of microwave energy is produced in a heating chamber.

It is another object of the invention to provide a microwave heating apparatus wherein load conditions of a microwave oscillator are rendered more stable whereby oscillator efficiency is improved.

It is a further object of the invention to provide a microwave heating apparatus wherein problems of no-load operation of a microwave oscillator are avoided.

It is a further object of the invention to provide a microwave heating apparatus permitting concentration of microwave energy in a localized region of a heating chamber whereby heating efficiency is improved and greater economy is achieved.

In accomplishing these and other objects there is provided according to the present invention a microwave heating apparatus wherein microwaves emitted by a suitable source are transmitted by a surface waveguide which is disposed in or below the lower surface of a heating chamber in which an object to be heated is placed. As is known, a surface waveguide may be constituted by a pair of identical opposed elements A and A', such as shown in FIGS. 1(a)–1(c), each of which is made of a metal conductor material and has a main body portion having a thickness which is small compared to the surface area thereof and extending in the direction of subsequent transmission of microwaves, i.e., along the Z axis as seen in the drawing and a plurality of extensions which are normal to the main body portion and which are positioned at regular intervals P, and are directed towards the extensions of the other element A or A', whereby there is defined between the elements A and A' a continous crenelated, zig-zag, or castelated slot B, the distance between adjacent crenelate portions being $p$ and such a construction being generally termed a periodic structure. The interval $p$ is made equal to or less than half the free-space wavelength of the electric waves transmitted. A surface waveguide need not of course be constituted by two separate elements A and A', but may be simply produced by forming a crenelated slot or pattern by punching a planar metal plate, or attaching conductive material on a ceramic base for example by a baking, sputtering or plating process.

Characteristics of the transmission of microwaves by such a surface waveguide differ from that of tubular waveguides or coaxial lines in various aspects. These aspects are employed to advantage in the apparatus of the invention. A first difference is that whereas in transmission by a tubular waveguide, presuming the waveguide walls are integral, there is no electromagnetic energy present at the exterior of the waveguide. In transmission by a surface waveguide, energy is also present outside the waveguide. The energy density profile produced during microwave transmission by a surface waveguide is as shown in FIG. 1(c). FIG. 1(c), FIG. 2 referred to below, and the following discussion are taken in reference to the situation in which no article to be heated is placed in a position to act as a load, i.e., to be heated, since this is the only situation in which practical measurements can be made, it being understood that the same principles illustrated and described apply when articles are placed in a position to be heated, although of course details of energy distribution vary according to the impedance presented by different articles and similar factors.

The energy density is greatest at the actual waveguide, and taking orthogonal axes X and Z to represent the plane of the waveguide, axis Y to be normal to both axes X and Z, and the Z axis to be the direction of transmission, there is an approximately exponential decrease of energy density with an increase of distance from the waveguide along the Y axis on either side of the waveguide.

In the apparatus of the invention an article to be heated is placed on a support located immediately above a surface waveguide having X and Z axes in a horizontal plane. Thus the article to be heated is heated rapidly since it is adjacent to the portion of a heating chamber in which the density of energy is greatest. By suitable design of the surface waveguide it is possible to make the profile shown in FIG. 1(c) flatter, i.e., to cause energy density to decrease more rapidly with distance from the plane of the waveguide and so increase concentration of energy in the region of the waveguide. Such an energy density profile is suitable in cases in which it is desired to effect heating in a manner to cause one surface of a heated article to become highly baked or be heated more rapidly than the rest of the article. An example of this in industry is the process of embedding of articles in initially soft thermosetting resin, which it is subsequently required to harden by heating without causing application of heat liable to affect the properties of the embedded article. An example in domestic use is the preparation of many kinds of tarts or desserts. Alternatively, the surface waveguide can be designed so that there is a greater spread of energy from the axis of transmission whereby heating of different portions of a comparatively tall article may be rendered more even. In this case also, however, it is to be noted that the heating method in the apparatus of the invention is basically different from that employed in conventional apparatus, since instead of heat being dispersed throughout the entire volume of a heating chamber, heat is concentrated in a region of the heating chamber which is closest to the article to be heated.

A second distinguishing characteristic of surface-transmitted microwaves is that the phase velocity, in the direction of transmission, is smaller than the speed of light, as opposed to microwaves transmitted by tubular waveguides, for which the phase velocity is greater than the speed of light. Therefore the length of waves following the line of transmission, i.e., the Z axis in FIG. 1, is greater than the free-space wavelength during transmission by a tubular waveguide and smaller than the free-space wavelength during transmission by a surface waveguide.

This second characteristic of surface waveguide transmission provides a further advantage in the apparatus of the invention. Apart from when exceptional load conditions obtain, transmission of electric waves along a waveguide results in standing waves and consequent maxima and minima, and high-spots of energy at half wavelength ($\frac{1}{2} \lambda s$) intervals such as illustrated in FIG. 2 for the case of a surface waveguide. For any given microwave frequency, in the apparatus of the invention employing a surface waveguide the distance between adjacent high-spots is less than half the free-space wavelength, as opposed to a conventional microwave heating apparatus employing a tubular waveguide in which the interval between adjacent high-spots is greater than half the free-space wavelength. In other words in the apparatus of the invention, energy maxima and minima are closer, and the heating effect produced is therefore more even.

As noted above, absence of an article to be heated was presumed in the preceding discussion. However, the presence of such an article, which constitutes a dielectric body, in the vicinity of the surface waveguide in no way affects the advantages of the invention, since the effect of such an article is to cause a greater spreading of energy distributed exponentially in a vertical plane normal to the plane of the waveguide, and hence a more even distribution in this vertical plane, although in this situation also there is still improved concentration of microwave energy in a specific portion of a heating chamber.

According to the invention, further evenness of heating may be achieved by rotating either the article to be heated or the surface waveguide, or causing the article to be heated to be moved reciprocally along a line which is inclined to the line of transmission of microwaves by the surface waveguide. Also, in order to present a more even load to a magnetron or other microwave source, in the apparatus of the invention there may be provided between the article to be heated and the surface waveguide a plate of dielectric material which also aids in avoiding problems of actuation of the magnetron under no-load conditions.

A better understanding of the present invention may be had from the following full description of several preferred embodiments of the invention when read in reference to the attached drawings, in which like numerals refer to like parts, and in which FIGS. 1a-1c and 2 are explanatory drawings referred to in the preceding description which show the construction of and typical energy distributions in a surface waveguide such as employed in the apparatus of the invention;

FIG. 3 is a cross-sectional view of a microwave heating apparatus according to one embodiment of the invention which constitutes a microwave oven.

Figure 6:
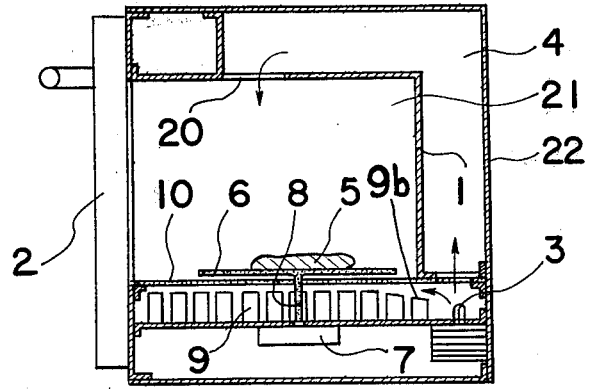
FIG. 6 is a cross-sectional view of a microwave oven according to the invention which employs both a tubular waveguide and a surface waveguide.
Figure 7:
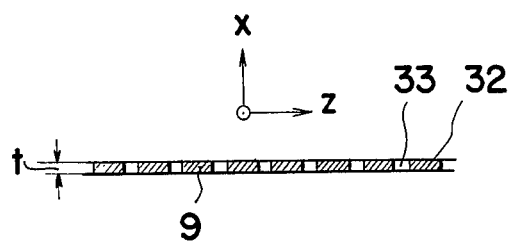
Figure 7:
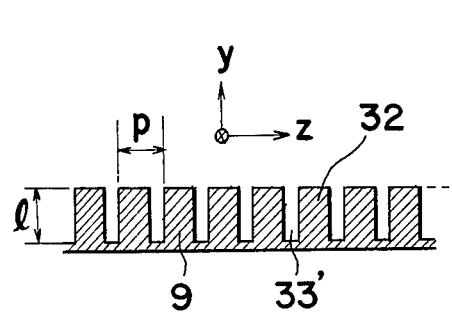
Figure 7:
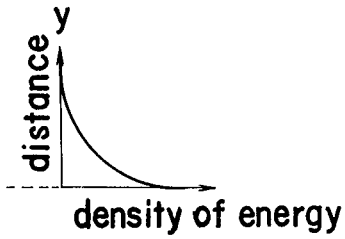
Figure 8:
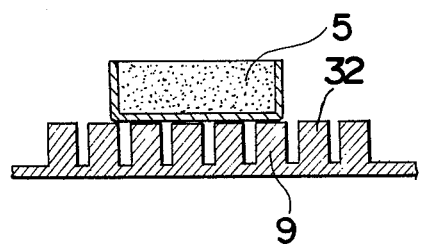
Figure 8:
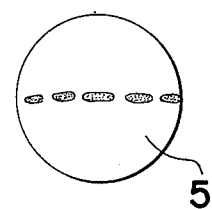
Figure 9:
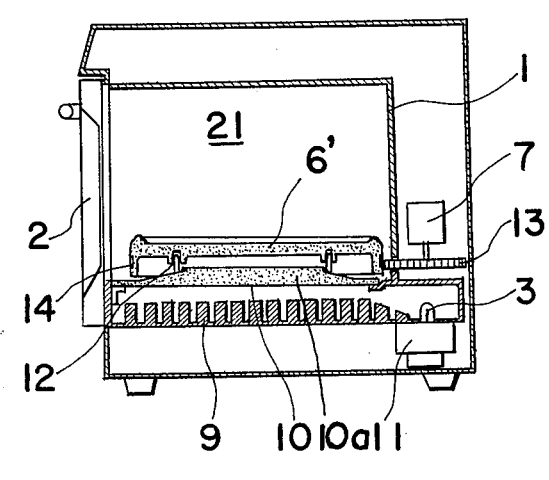
Figure 10A:
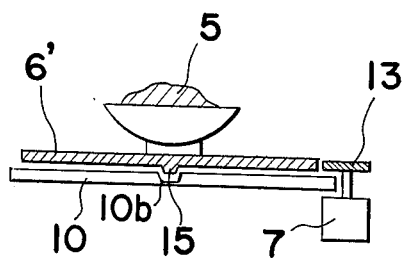
Figure 10B:
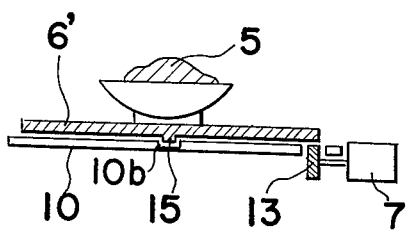
Figure 10C:
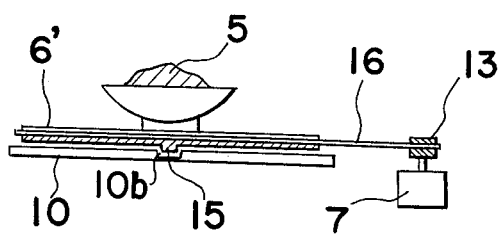
Figure 11A:
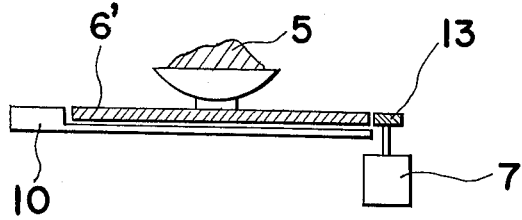
Figure 11B:
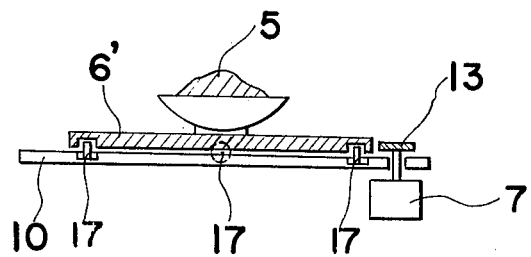
Figure 12A:
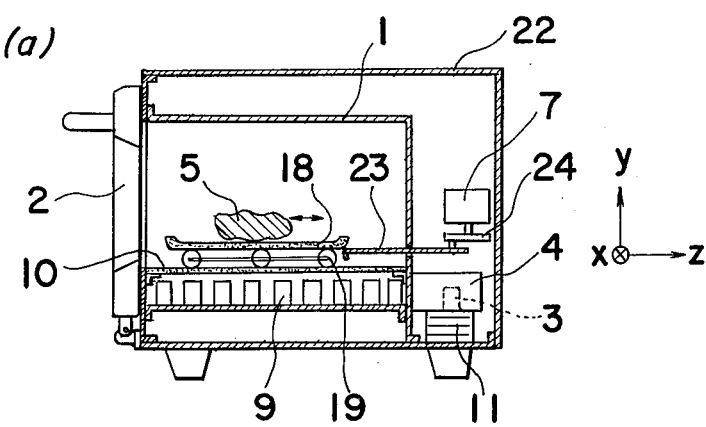
Figure 12B:
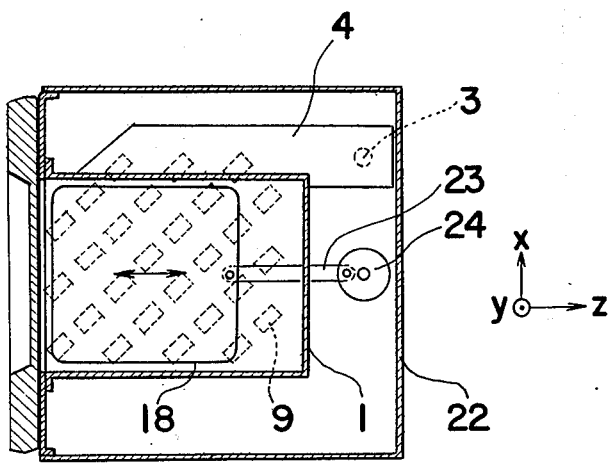
Figure 13:
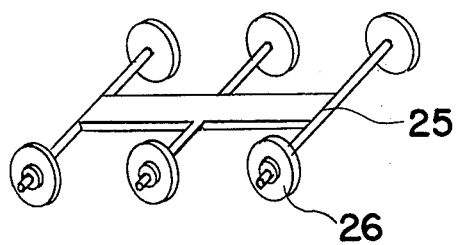
Figure 14:
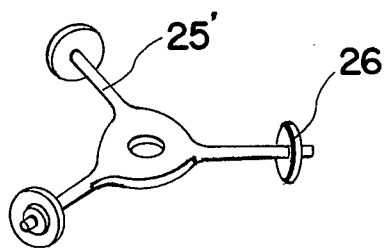
Figure 15:
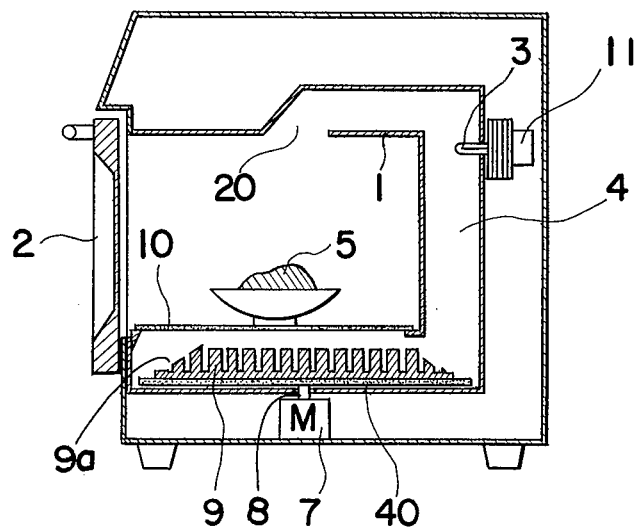
Figure 16A:
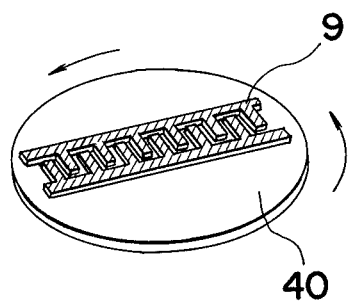
Figure 16B:
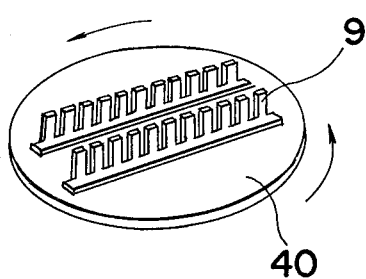
Figure 17A:
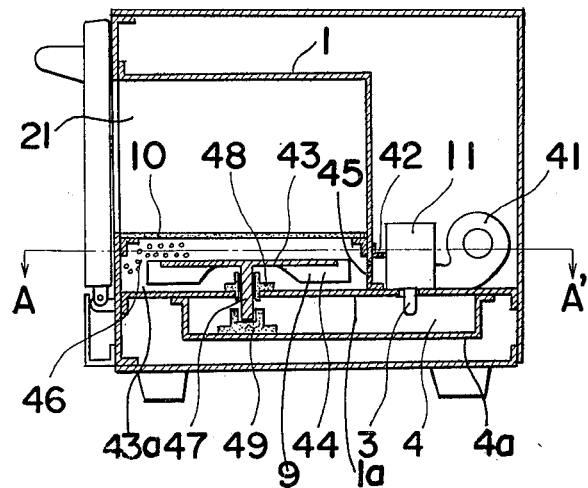
Figure 17B:
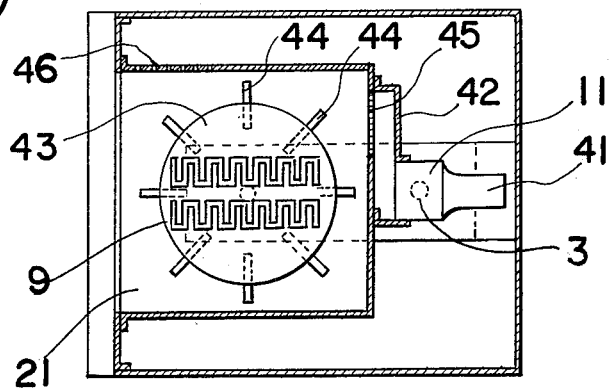
Figure 18:
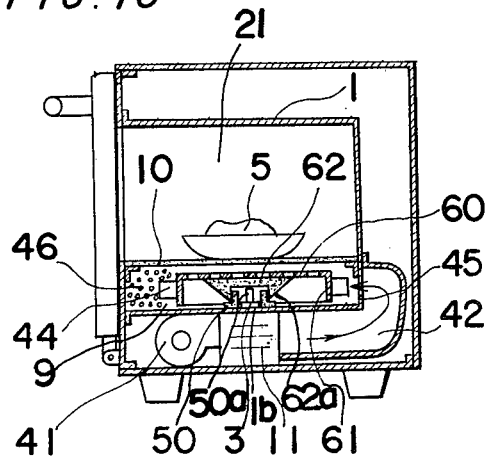
Figure 19:
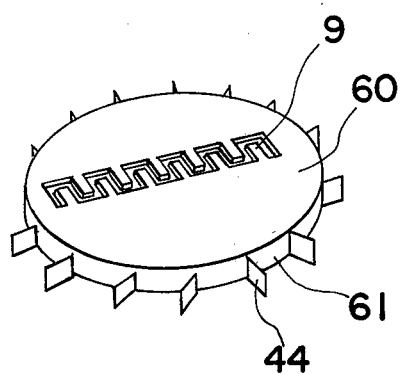
Figure 20A:
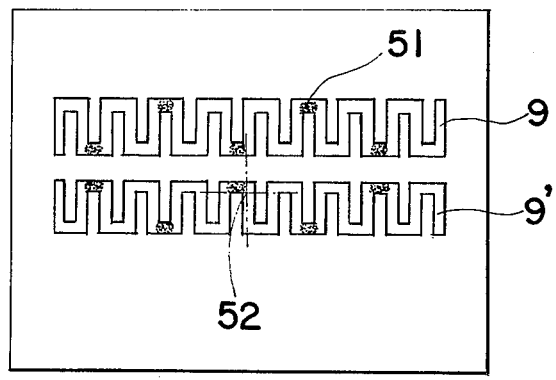
Figure 20B:
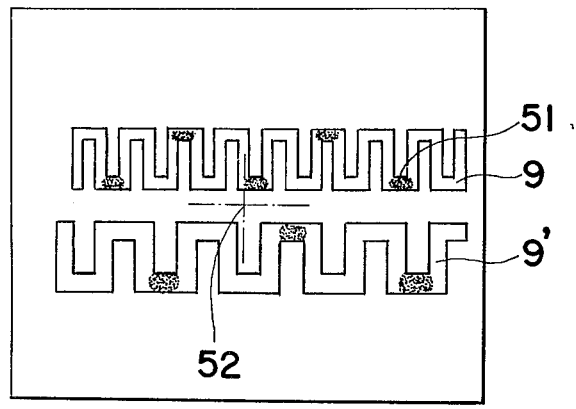
Figure 21:
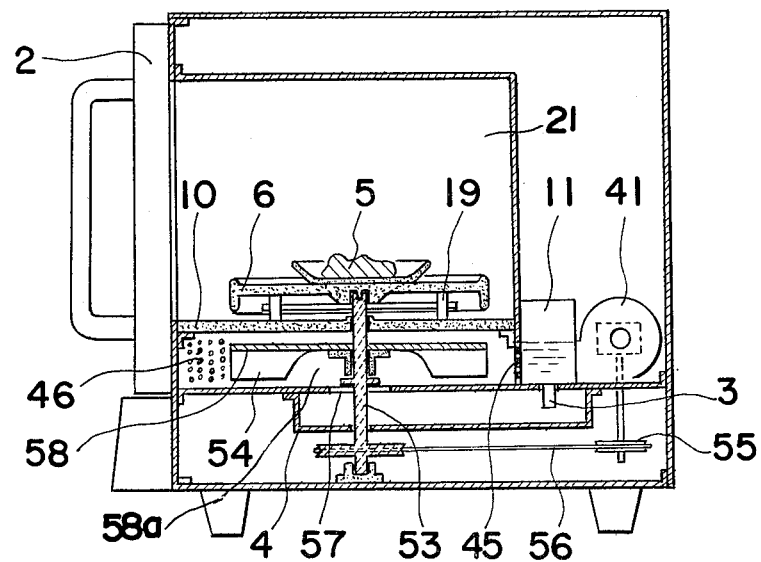

FIGS. 7(a)-7(c) are explanatory drawings of an alternative type of surface waveguide employable in the microwave oven of FIG. 6;

FIG. 8 shows a typical energy distribution pattern produced by the waveguide of FIG. 7;

FIG. 9 is a cross-sectional view of a microwave oven wherein a turntable having no central shaft is rotatable to rotate an article of food supported thereon;

FIGS. 10(a)-10(c) show different modes of drive of a turntable in a microwave heating apparatus according to the invention;

FIGS. 11(a) and 11(b) show other modes of drive of a turntable according to the invention;

FIGS. 12(a) and 12(b) are respectively side elevation and plan cross-sectional views showing main portions of a microwave oven according to another embodiment of the invention wherein a food support table is reciprocally movable in a horizontal plane;

FIGS. 13 and 14 are perspective views of roller means for food support table according to different embodiments of the invention;

FIG. 15 is a cross-sectional view of a microwave heating apparatus according to another embodiment of the invention wherein a surface waveguide is rotated;

FIGS. 16(a) and 16(b) are perspective views of different types of rotatable surface waveguides;

FIGS. 17(a) and 17(b) are respectively side elevation and plan cross-sectional and plane views showing main portions of a microwave heating apparatus according to another embodiment of the invention;

FIG. 18 is a cross-sectional view showing a microwave heating apparatus according to another embodiment of the invention providing improved surface waveguide efficiency;

FIG. 19 is a perspective view of a surface waveguide employable in the apparatus of FIG. 18;

FIGS. 20(a) and 20(b) are explanatory drawings showing disposition of surface waveguides to avoid unevenness of heating;

FIG. 21 is a cross-sectional view of a microwave heating apparatus according to another embodiment of the invention.

The invention is described below in reference to use as a microwave oven for cooking food, it being understood that the invention is equally applicable to microwave heating for other purposes.

Figure 4:
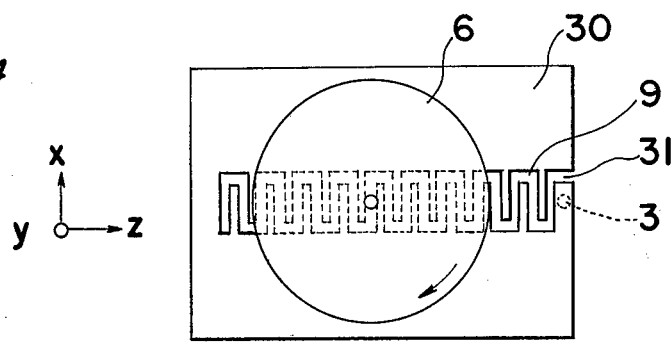
FIG. 4 is a plan view of a turn-table and surface waveguide employed in the embodiment of FIG. 3.

Referring now to FIGS. 3 and 4, there is shown a microwave oven comprising an outer case 22 of generally square or rectangular cross-section within which there are provided walls 1 which are separate from the outer case 22 and which define a heating chamber 21 having an open front which is sealable by a door 2 pivotally mounted on the front of the outer case 22. In a lower portion of the heating chamber 21 there is provided a horizontally disposed surface waveguide 9, which is constituted by a metal plate 30 having a crenelated slot 31 defined therein, and a cover 10, which is made of a low-loss dielectric material such as plastic, ceramic material, or glass, and is provided over the upper surface of the waveguide 9, both the waveguide 9 and the cover 10 extending between front and rear walls of the heating chamber 21 and being slightly above the bottom wall 1 of the heating chamber 21.

In a lower portion of the oven there is provided a motor 7 having an output shaft coupled to a vertically aligned drive shaft 8 which passes through and is freely rotatable in suitable holes formed in central portions of the surface waveguide 9 and cover 10, and extends upwards into a generally central portion of the heating chamber 21 to above the upper surface of the cover 10, and on the upper end of which is fixedly mounted a horizontally disposed turntable 6 for support of an article of food 5 to be cooked. The turntable 6 is suitably made of glass, ceramic material or other dielectric, and is rotated upon actuation of the motor 7.

Mounted on a rear portion of the lower surface of the bottom wall 1 of the heating chamber 21 there is a magnetron 11, or similar oscillator means for production of microwave output. An antenna, i.e., the output loop 3 of the magnetron 11 extends into the space 9a defined between the surface waveguide 9 and the heating chamber bottom wall 1 and is in line with the Z axis, i.e., the axis of wave transmission by the waveguide 9 and near one end of the castelated slot 31 formed in the plate 30, whereby output of the magnetron 11 is coupled to the surface waveguide 9. When the magnetron 11 is actuated, output therefrom is transmitted from the end of the surface waveguide 9 where the antenna 3 is located to the opposite end of the waveguide 9 where transmitted waves are reflected, and there is therefore produced along the Z axis an energy density pattern having successive portions of maximum density and minimum density such as shown in FIG. 2, and along the vertical Y axis an energy density profile such as shown in FIG. 1(c). As noted above, if it is required to produce a highly baked surface, then the waveguide 9 is so designed that there is a more rapid decrease of energy density with distance along the Y axis, whereas, to produce more even heating, the design of the waveguide should be such that this decrease is less rapid. In the latter case, although the heating effect is greatest immediately at the surface of the turntable 6, it has been found that in practice heating of the entire volume of an article of food 5 is effectively even. In tests conducted it was found that for liquids, e.g. milk in bottles or similar tall containers heating proceeded more efficiently when the waveguide design was such that there is a more rapid decrease of energy density with distance along the Y axis.

In all cases, heating throughout an article of food 5 is much more even than is possible with conventional microwave heating means since distribution of microwave energy in the vertical plane is not patchy and even if an article of food 5 does not lie entirely in the principal energy radiation area indicated by the no-load profile of FIG. 1(c), this profile is modified to some extent by the presence of the article 5 and the heat generated in the lower portion of the article 5 rises.

There is however unevenness of heat distribution in the horizontal plane, i.e., the plane defined by the X and Z axes, as indicated by FIG. 2. For an article of food 5 covering a comparatively large area, this unevenness may be effectively compensated by actuating the motor 7 to cause slow rotation of the turntable 6 so as to bring successive portions of the article of food 5 close to the surface waveguide 9 constituting a source of heat.

The profile of energy distribution around the surface waveguide 9 is to a large extent determined by the elements which are most adjacent thereto, i.e., adjacent portions of the heating chamber walls 1 and the dielectric cover 10, and the relative position of the magnetron output loop 3. In other words, by suitable selection of material and the dimensions of the walls 1 and cover 10 and of the relative positions of the walls 1, waveguide 9, cover 10 and output loop 3, the energy profile can be made such that extra strong heating of concentric bands of the article of food 5 during rotation of the turntable 6 is avoided.

Another advantage of the apparatus of FIG. 3 is that since the output of magnetron 11 is supplied to the surface waveguide 9 rather than being transmitted directly to an article of food 5, changes in the size, dielectric properties, etc. of different articles 5 has much less effect on the action of the magnetron 11 than in an over with, for example, a tubular waveguide. The effect of such changes is even further reduced by the provision of the cover 10 made of plastic, ceramic material, glass or other low-loss dielectric, since, as viewed from the magnetron 11, the load is constituted almost entirely by the surface waveguide 9 and cover 10. The presence of different articles of food 5 therefore has much less effect on the variation of load impedance of the magnetron 11. This is an advantage since, as is known, oscillation efficiency of a magnetron or a similar oscillator varies when load impedance varies, and by reducing such variation more stable oscillator action can be achieved.

In addition to this the cover 10 also acts to stabilize action of the surface waveguide 9, which is influenced principally by media most adjacent thereto and also acts as a load if the heating apparatus is actuated without an article of food 5 having been placed therein.

Thus, in the apparatus of the invention food is heated evenly in the vertical plane and any unevenness of heating in the horizontal plane is effectively eliminated by rotation of a turntable means. Also, there is improved efficiency of heating, and hence greater economy, since microwave output is concentrated in a particular portion of a heating chamber, rather than being distributed throughout the chamber, and there is the further advantage that more stable oscillator efficiency may be achieved.

Figure 5A:
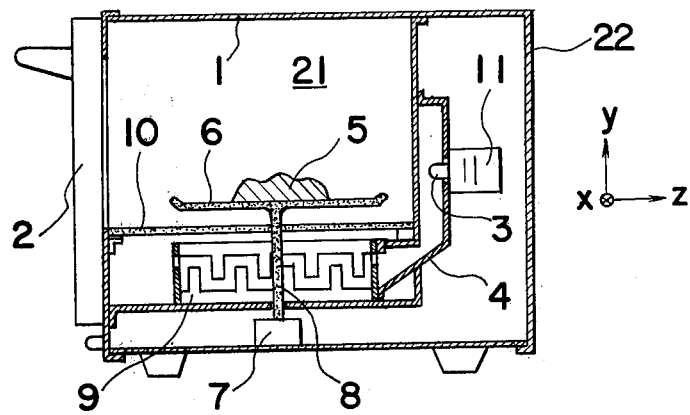
FIG. 5(a) is a cross-sectional view of a microwave heating apparatus according to another embodiment of the invention.
Figure 5B:
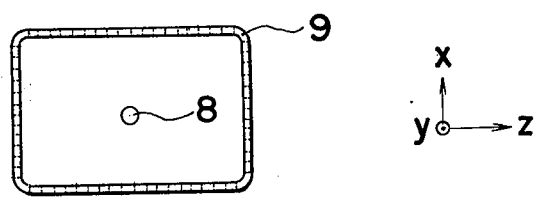
FIG. 5(b) is a plan view showing disposition of a surface waveguide in the heating apparatus of FIG. 5(a)

In the embodiment of FIGS. 3 and 4, the article of food 5 is placed directly in the plane of energy radiated from the surface waveguide 9. In the embodiment of FIGS. 5a and 5b, to which reference is now had, a surface waveguide 9 is so disposed that the plane of microwave transmission thereby is normal to the plane of the turntable 6 which supports an article of food 5, whereby the article of food 5 is not directly exposed to microwave energy radiation from the waveguide 9. In this embodiment, as shown most clearly in FIG. 5(b), the surface waveguide is disposed so that it is some distance from and surrounds the drive shaft 8 of the turntable 6, the drive shaft 8 being generally at the centre of the configuration defined by the waveguide 9. With this disposition of the surface waveguide 9, during transmission of microwaves thereby energy is radiated in the plane defined by the X and Z axes, there being no radiation along the vertical Y axis.

In FIG. 5(a), the top wall of the heating chamber 21 is defined directly by the top wall of the outer case 22, the remaining portions of the chamber 21 being defined by walls 1 which are separate from the walls of the case 22. The surface waveguide 9 is mounted on the bottom wall 1 of the heating chamber 1 and is adjacent to the rear wall 1 of the heating chamber 1 but does not extend to the front wall 1 of the heating chamber 21. The cover 10, however, extends over the entire lower portion of the heating chamber 1, as in the previously described embodiment. The magnetron 11 is mounted in a generally central rear portion of the heating apparatus, and microwaves emitted from the output antenna 3 thereof are supplied to the surface waveguide 9 by a tubular waveguide 4 provided at the rear of the heating chamber 21.

With this construction the whole of the lower portion of the heating chamber 21 is heated as a result of reflection of radiation of the surface waveguide 9 from the heating chamber walls 1 and an article of food 5 is therefore heated evenly, and at the same time since the output of magnetron 11 is coupled to the surface waveguide 9 by the tubular waveguide 4, as viewed from the magnetron 11 variation of load impedance is even less than in the embodiment of FIGS. 3 and 4, and there is consequently a further improvement of oscillation efficiency.

Referring now to FIG. 6, there is shown another embodiment of the invention wherein the surface waveguide 9 is disposed horizontally, i.e., in a disposition such that energy radiated therefrom impinges directly on an article of food 5 supported on the turntable 6 made of dielectric material, and, as indicated by the arrows in the drawing, microwaves emitted by the output antenna 3 of the magnetron 11, which is provided at the rear of the heating chamber 21, are transmitted by the surface waveguide 9 along the lower portion of the heating chamber 21 and are also transmitted by a tubular waveguide 4 defined around the rear and upper portions of the heating chamber 21 to an opening 20 formed in a generally central portion of the upper wall 1 of the heating chamber 21, microwaves being directed through the opening 20 into the upper portion of the heating chamber 21.

As shown in FIGS. 7(a) and 7(b), the surface waveguide 9 employed in the embodiment of FIG. 6 of the invention is a plate 32 which is made of metallic conductive material, and has a thickness $t$ which is less than half the free-space wavelength of transmitted microwaves. Unlike the comparatively flat metal plate forming the surface waveguide employed in the previously described embodiments, the metal plate 32 employed in this embodiment has a height which is appreciably greater than the thickness $t$ thereof, and has formed therein a series of perpendicular slits 33' having a length $l$ and spaced along the Z axis at generally regular intervals $p$, each interval $p$ being less than half the free-space wavelength of transmitted microwaves. With this type of periodic construction, assuming microwave transmission along the Z axis, energy density falls off exponentially with increasing distance along the Y axis from the waveguide 9, as indicated in FIG. 7(c), and noted before, but whereas in the surface waveguide 9 of FIG. 1 there are produced the comparatively large high spots shown in FIG. 2, in the surface waveguide 9 of this embodiment high-spots are comparitively fine and elongated, as illustrated in FIG. 8, whereby there is closer continuity of high-spots, and hence improved evenness of heating. The surface waveguide of FIGS. 7(a)–7(c) has the further advantage compared with that of FIG. 1 that there is improved stability of surface wave characteristics, although both types of surface waveguides are suited for the purpose of the invention.

Returning to FIG. 6, the end portion 9b of the surface waveguide 9 nearest to the output antenna 3 is tapered, for improved coupling. The range of surface wave energy distribution of the surface waveguide of FIG. 6 is extremely narrow. This has the advantage that there is improved concentration of heat and a highly baked crust or outer surface portion of an article of food 5 can be be more efficiently achieved. However, since such a surface waveguide is less satisfactory if tall articles of food are to be cooked, heating of the upper portion of such a tall article of food is assisted by microwave energy transmitted by the tubular waveguide 4 through the opening 20 and into the upper portion of the heating chamber 21.

Needless to say efficient heating of the upper portion of the heating chamber 21 may also be effected by providing another surface waveguide across the heating chamber upper wall 1 in a position to receive microwaves transmitted by the tubular waveguide 4. Also, it is possible to provide in association with the tubular waveguide 4 a lossy wedge or similar element which is not normally in the tubular waveguide 4 but may be inserted thereinto, upon actuation of suitable external control means, to absorb waves going along the guide when the article of food 5 is comparatively flat and a highly baked outer surface is required.

In the embodiments described above, since electric energy is concentrated in the vicinity of the surface waveguide 9, in some cases presence of a drive shaft 8 for rotating the turntable 6 in the immediate vicinity of the waveguide 9 may present the inconvenience that boundary conditions of the waveguide become disordered, that there is excessive heating of the drive shaft 8, or that the shaft 8 hinders or imposes restrictions on the mounting or disposition of the waveguide. Such inconvenience is avoided by employing a turntable drive mode such as shown in FIG. 9, to which reference is now had.

In this embodiment there is employed a surface waveguide 9 such as that described in reference to FIGS. 7(a)-7(c), the waveguide 9 being the only microwave transmission means. The drive shaft 8 is dispensed with, and instead the turntable 6' is made of dielectric material and is rotatably supported by two or more rolls 12 which are rotatably mounted on and project to below lower surface portions of the turntable 6' and are symmetrically disposed with respect to the center of the turntable 6'. The lower surface of the dielectric cover 10 is flat and the upper surface thereof has outer edge portions which slope gently upwards to a central, flat, circular plateau 10a which has a radius generally equal to or slightly less than an imaginary circle centered on the center of the turntable 6' and passing through the rolls 12 symetrically disposed below the turntable 6'. The turntable 6' is supported by the rolls 12 which roll around the central plateau 10a of the cover 10 to permit rotation of the turntable 6'. The outer peripheral portion 14 is made rough, or has bonded thereto a material having a high coefficient of friction, and is engaged by a horizontally disposed drive wheel 13, on the outer periphery of which is bonded a material with a high coefficient of friction and which is fixedly mounted on the output shaft of the motor 7, mounted in a rear portion of the apparatus, the turntable 6' thus being rotatable upon actuation of the motor 7.

If it is required to heat a liquid in a bottle or similar container, this is effected most efficiently by simply removing the turntable 6' from the heating chamber 21, and placing the container directly on the central plateau 10a of the cover 10 where the heating effect is greatest.

Other turntable drive modes which avoid problems of disorder of wave transmission boundary conditions, overheating of a drive shaft, and disposition of a waveguide are shown in FIGS. 10(a) and 11(b).

In FIGS. 10(a), 10(b) and 10(c) the cover 10 has a flat lower surface and an upper surface which is flat except for a central recessed portion 10b in which a downwardly projecting stub 15 on the central portion of the lower surface of the turntable 6' freely rotates. In FIG. 10(a), drive from the motor 7 is supplied to the turntable 6' by the drive wheel 13 contacting the outer periphery of the turntable 6'. In FIG. 10(b) the drive wheel 13 is disposed perpendicularly to the turntable 6' and contacts the outer edge portion of the lower surface of the turntable 6'. In FIG. 10(c), motor 7 drive is transmitted to the turntable 6' by a drive belt 16 which passes around the outer periphery of the turntable 6' and around a horizontally disposed drive wheel 13 mounted on the output shaft of the motor 7.

In FIGS. 11(a) and 11(b) the drive wheel 13 is disposed horizontally and is in frictional contact with the outer periphery of the turntable 6'. In FIG. 11(a), in the upper surface of the cover 10 there is defined a large circular recess which has a radius generally equal to or slightly greater than that of the turntable 6' and in which may be accommodated the entire turntable 6' except for a small peripheral portion thereof facing the drive wheel 13. In FIG. 11(b) in the outer edge portion of the lower surface of the turntable 6' there is defined a continuous circular groove which centers on the center of the turntable 6' and in which roll a plurality of rolls 17 which are rotatably mounted on the upper surface portions of the cover 10, and are symmetrically disposed on the circumference of an imaginary circle center on the central hole in the upper surface of cover 10.

Referring now to FIGS. 12(a) and 12(b), there is shown an embodiment of the invention wherein an article of food 5 is placed on a reciprocally movable support 18. The support 18 is smaller in area than the cover 10 and is mounted on a roller assembly 19 which is rollable on the cover 10 to permit the support 18 to be moved reciprocally forwards and rearwards, i.e., towards and away from the door 2, as indicated by the arrow of FIG. 12(b). The front end of a rearwardly extending straight lever 23 is pivotally attached to a generally central portion of the lower rear edge of the support 18. The rear end of the lever 23 is pivotally mounted on a pin which is fixedly attached to an off-center portion of a horizontally disposed drive wheel 24 fixed to the output shaft of the motor 7, actuation of which causes the support 18 to be moved in the abovedescribed reciprocal motion. This embodiment employs a plurality of surface waveguides 9 of the type shown in FIGS. 7(a)-7(c), which, as shown most clearly in FIG. 12(b) are disposed in a generally parallel array along lines which are inclined with respect to the line of reciprocal movement of the support 18. Microwave output from the output antenna 3 of the magnetron 11 is supplied to all surface waveguides 9 via a tubular waveguide 4, high-spots produced by the surface waveguides 9 being schematically indicated by the dashed line portions of FIG. 12(b). Thus an article of food 5 on the support 18 will be in effect moved transversely across the lines of high-spots produced by the various surface waveguides 9, whereby the article of food 5 is heated evenly, evenness of heating being particularly effective if the surface waveguides are so disposed with respect to one another that the series of high-spots produced by any one surface waveguide 9 is staggered with respect to the series of high-spots produced by neighbouring waveguides 9.

Provision of the roller assembly 19 is not of course essential, but is preferable, since from the standpoint of heat resistance and other factors, dielectric materials employed for the cover 10 and support 18 are materials such as glass or ceramic material, which have comparatively high coefficients of friction.

The roller assembly 19 suitably has a construction such as shown in FIG. 13, and comprises a generally rectangular frame 25 which is detachly connectable to the lower surface of the support 18 and has fixed to and extending at right-angles from opposite long sides thereof a plurality of shafts on the outer ends of which are rotatably mounted small wheels 26. The roller assembly 19 has the advantage that it may easily be removed from the apparatus as required, and also that there is no need for a special work stage during assembly during which small wheels are attached to the support 18. The frame 25 and wheels 26 are suitably made of a dielectric material, although in many cases heating apparatus operation is practically unaffected if either or both elements are made of metal.

FIG. 14 shows an example of a rolling assembly which is suitable for employment in association with a turntable 6 such as described earlier, and which comprises a frame 25' having a central portion in which there is formed a mounting hole for mounting of the frame 25' on a suitable lower surface projection of the turntable 6, and from which extend three symmetrically disposed shafts having wheels 26 rotatably mounted on the outer ends thereof.

The embodiments described hitherto employ a surface waveguide or waveguides which are stationary and a food support means which is stationary. However, the invention is by no means limited to such an arrangement, and the objects of the invention may be equally achieved by employing a stationary food support means and a moving waveguide or waveguides, since energy will continue to be carried by along a waveguide even if the waveguide is physically moved. In other words the same evenness of heating can be achieved by rotating the waveguide as is achieved by rotating or otherwise moving a support for an article of food.

Several embodiments of the invention employing movable waveguides are described below in reference to FIGS. 15 through 20.

In FIG. 15, the heating chamber 21 is effectively defined by the door 2, side walls 1 not shown, a top wall 1 having an opening 20, a rear wall 1, and the dielectric cover 10. The output antenna 3 of the magnetron 11 couples microwave output to a tubular waveguide 4 which transmits this output into the upper portion of the heating chamber 21 via the upper opening 20 and into a surface waveguide accommodation space 9a which is defined below the cover 10 and which may be considered as an extension of the tubular waveguide 4. In the lower portion of the surface waveguide accommodation space 9a there is a horizontally disposed rotatable support 40 which is made of glass, ceramic material or other suitable low-loss dielectric, and which is fixedly mounted on a shaft 8 coupled to and driveable by the motor 7 which is mounted in the lower portion of the apparatus. One or more surface waveguides 9 are fixedly mounted on the rotatable support 40. Thus, upon actuation of the magnetron 11 and motor 7, microwave energy distributed in particular patterns on the surface waveguide or waveguides 9 is moved circularly below an article of food 5 on the cover 10, and microwave energy is simultaneously directed into the upper portion of the heating chamber 21, whereby the article of food 5 is rapidly and evenly cooked.

In this embodiment, it is evident that conditions for coupling between the tubular waveguide 4 and a surface waveguide 9 are variable and possibly less efficient than when both waveguides 4 and 9 are stationary. However, because of this variation in coupling conditions, the pattern of high-spots produced by the surface waveguide 9 is constantly varied as the waveguide 9 is rotated, which has the advantage that the overall heating effect is made still more even.

Thus, be employment of a surface waveguide for transmission of microwave energy, as well as offering the advantages of improved concentration of heat and easy production of a crusty surface without burning of food, the invention also offers the advantage in terms of manufacture that a greater variety of constructions may be selected to achieve the same aims.

Needless to say, the same effects are achieved if the surface waveguide support is moved linearly, rather than being rotated, in a horizontal plane, or if movement thereof is a combination of linear and rotary movement. Also, of course, movement of a surface waveguide support may be effected manually rather than by electrical drive means, or by a combination of manual and electrical drive means.

FIGS. 16(a) and 16(b) show examples of surface waveguides 9 which may be mounted on the rotatable support 40. In FIG. 16(a), the support 40 carries a flat surface waveguide 9 having a continuous castelated slot. In FIG. 16(b), the support 40 carries a pair of vertical waveguides 9 each having a series of slits. When the waveguides of FIG. 16(b) are employed, the waveguides may of course have tapered ends to achieve improved coupling with the tubular waveguide 4.

Referring now to FIGS. 16(a) and 16(b) show there is shown an embodiment of the invention which does not require a separate motor for rotating the surface waveguide support. In this embodiment a circular, horizontally disposed rotary support 43, which lies in a lower portion 43a of the heating chamber 21 defined below the cover 10, carries on the upper surface thereof a pair of flat surface waveguides such as described in reference to FIG. 1 which lie parallel to one another and are disposed symmetrically on opposite sides of the center of the circular support 43. A plurality of vertically aligned blades 44 which are disposed radially and symmetrically with respect to the center of the support 43 are fixedly attached to the lower surface of the support 43. The upper end of a downwardly extending shaft 47 is fixedly attached to the center of the lower surface of the support 43. The shaft 47 passes downwards through a sleeve bearing 48 fixed to a wall 1a which constitutes both the bottom wall of the heating chamber 21 and the upper wall of a horizontally disposed tubular waveguide 4, and the lower end of the shaft 47 is rotatably supported in a bearing 49 which is mounted on the lower wall 4a of the tubular waveguide 4. The tubular waveguide 4 transmits microwave output from a magnetron 11 which is provided in a rear portion of the heating apparatus. Adjacent to the magnetron 11 there is provided a blower 41 which directs air towards the magnetron 11 to cool the magnetron 11, the blower 41 directing air forwards and being positioned to the rear of the magnetron 11 in terms of the heating apparatus. After passing around the magnetron 11, air emitted by the blower 41 passes through a plurality of holes 45 formed in a lower portion of the rear wall 1 of the heating chamber 21, enters the heating chamber lower portion 43a, strikes the blades 44, thus causing rotation of the circular support 43 and surface waveguides 9 carried thereby, and then exits from the lower portion 43a of the heating chamber via a plurality of holes 46 formed in a lower, forward portion of a side wall 1 of the heating chamber 21. Thus, economy is achieved since a separate motor for driving the support 43 may be dispensed with. Also, if there is a certain amount of clearance between the shaft 47 and the sleeve bearing 48 and support bearing 49, movement of the support 43 is not purely rotary but also includes a certain amount of linear movement of opposite portions of the support 43 towards and away from a vertical axis, thus producing a more haphazard distribution of high-spots on the surface waveguides 9 and hence more even heating.

If the shaft 47 is made of metal, there is the further advantage of improved coupling between the tubular waveguide 4 and the surface waveguides 9, since in this case the shaft 47 acts to couple microwaves emitted by the output antenna 3 to the center of the support 43, which is always in the same position with respect to the surface waveguides 9 regardless of movement of the waveguides 9. By suitable selection of the length of the tubular waveguide 4 a more stable operating state of the magnetron 11 can be achieved since it is made more independent than is possible when the magnetron output is coupled directly to a surface waveguide or waveguides 9.

Generally, it is preferable to make surface waveguides of a good conductor such as copper or aluminium. With such material, however, there is the disadvantage that after long exposure to high temperatures the material may warp, resulting in alteration of waveguide characteristics and hence reduced effective service life. The apparatus of FIGS. 17(a) and 17(b) offers a further advantage in this respect, since, as well as causing rotation of the support 43, air from the blower 41 also acts to cool the surface waveguides 9 and therefore acts to prevent distortion thereof.

Referring now to FIGS. 18 and 19 there is shown an embodiment in which a circular metal plate 60 disposed horizontally below the cover 10 carries a flat surface waveguide 9 having a central point concident with that of the plate 60. Around the entire periphery of the metal plate 60 there is fixed a wall 61 which extends vertically downwards, which is made of a conductive metal, and to which are attached at regular intervals blades 44 which extend radially outwards with respect to the center of the plate 60. To a central area of the lower surface of the plate 60 there is fixedly attached a rotation element 62 which is made of a low-loss dielectric material having a low coefficient of friction and is in the shape of an inverted cone having a circular opening 62a formed in the lower central portion thereof. The lower edge of the rotation element rests on and is slidable on a round outer wall portion of a bearing 50 which is also made of low-loss dielectric material having a low coefficient of friction, which is supported on the bottom wall 1 of the heating chamber 21 and in a central portion of which there is formed an opening 50a which is in line with the opening 62a formed in the rotation element 62 and with an opening 1b formed in the heating chamber bottom wall 1. The magnetron 11 is provided in a generally central portion of the heating apparatus and the output antenna 3 extends upwards through the opening 1a and 50a and into the opening 62a, i.e., the output antenna 3 is directly below and in line with the center of the circular plate 60 and the waveguide 9 carried thereby. The blower 41 is provided in a lower portion of the heating apparatus forward of the magnetron 11 and directs cooling air rearwards onto the magnetron 11. As indicated by the arrow in FIG. 18, after passing around the magnetron 11, air emitted by the blower 41 passes rearwards and upwards, passes through holes 45 formed in a lower portion of the heating chamber rear wall 1, passes through the lower portion of the heating chamber 21, where it exerts pressure on the blades 44, thus causing rotation of the circular plate 60 and waveguide 9, and simultaneously cools the plate 60 and waveguide 9, and then exits from the lower portion of the heating chamber via holes 46 formed in a lower portion of a side wall 1 of the heating chamber 21.

The apparatus of FIG. 18 has the advantage that magnetron 11 output is always coupled to the same point of the surface waveguide 9 regardless of rotation of the waveguide 9. A further advantage is that there is less dispersion of microwave energy, since the metal side wall 61 around the plate 60 acts to concentrate output from the output antenna 3 in a restricted area below the plate 60.

Referring to FIG. 20(a), to provide a broader heating area it is frequently preferable to provide a pair of surface waveguides 9 parallel to one another. However, if the surface waveguides 9 have the same length and are exactly aligned with one another, successive high-spots 51 produced on one waveguide 9 are in line with successive high-spots 51 produced on the other waveguide 9, and therefore rotation of either a turntable supporting an article of food 5 or a plate supporting the surface waveguides 9 may result in extra application of heat over banded areas of the article of food 5 which are brought directly above the high-spots 51.

This problem can be avoided, if, as shown in FIG. 20(a), the center 52 of rotation of the plate is disposed asymmetrically with respect to the pair of surface waveguides 9, thereby preventing the orbits of high-spots 51 from overlying one another. Also this problem may be avoided if, as shown in FIG. 20(b), two surface waveguides 9 are provided which are equal in length and parallel but with different size crenelated portions with respect to one another, in a manner such that the series of high-spots 51 on one waveguide 9 is staggered with respect to the series of high-spots 51 on the other waveguide 9. With this arrangement, during relative rotation of the surface waveguides 9 and an article of food 5, the banded portions of the article of food 5 heated by the high-spots 51 of one waveguide 9 are different from those heated by the high-spots of the other waveguide 9, whereby heating is more even.

FIG. 21 shows a microwave heating apparatus wherein both an article of food and a surface waveguide can be rotated. An article of food 5 is supported on a horizontal turntable 6 mounted on the upper end of a vertical drive shaft 53, which passes through the lower portions of an opening formed in the cover 10, through a heating chamber 58a defined between the cover 10 and the bottom wall 1 of the heating chamber 21, through a comparatively large opening 57 defined in the heating chamber bottom wall 1, and through a generally horizontal tubular waveguide 4 which is defined immediately below the heating chamber 21 and communicates with the large opening 57, the lower end of the drive shaft 53 being rotatably supported in a suitable bearing in the lower portion of the apparatus. Rolling support of the turntable 6 on the cover 10 is suitably provided by means of a roller assembly 19 such as described in reference to FIG. 14. Around a lower end portion of the drive shaft 53 there is fixedly mounted a pulley which is connected by a drive belt 56 to a pulley 55 which is connected through suitable gear means to a drive motor, not shown, the turntable 6 thus being rotated upon actuation of the drive motor.

A horizontally disposed rotary plate 58 carrying a horizontal waveguide 9 and fitted with radially disposed, vertical blades 54 is provided in the lower portion of the heating chamber 58a and is supported by suitable bearing means and is freely rotatable about the drive shaft 53.

The magnetron 11 is provided at the rear of the heating chamber 21, and output therefrom is transmitted along the tubular waveguide 4 and through the opening 57 into the lower portion of the heating chamber 58a, resulting in production of surface waves on the waveguide 9 and also, since the opening 57 is comparatively large, of a three-dimensional wave pattern throughout the lower portion of heating chamber 58a. At the same time the turntable 6 is rotated by the drive motor and air from a blower 41 which is provided at the rear of and acts to cool the magnetron 11 passes through holes 45 in the rear wall 1 to enter the lower portion of the heating chamber 58a, impinges on the blades 54 thus causing rotation of the waveguide carrier plate 58, and exits from the lower portion via holes 46 in the side wall 1 of the heating chamber 21. Drive transmitted via the drive belt 56 is such that the turntable 6 is rotated at a different speed from that of the plate 58, with the overall result that, due to the movement of the pattern of high-spots on the waveguide 9 and movement of the article of food 5 relative to the high-spots in the horizontal plane of the three-dimensional pattern established in the lower portion 58a, effectively even heating of an article of food 5 on the turntable 6 is achieved.

Even heating of an article of food 5 may of course also be achieved by rotating a surface waveguide, for example by the means shown in FIG. 18 and simultaneously causing reciprocal movement of a support for the article shown in food 5, for example by the means of FIG. 12.

What is claimed is:

1. A microwave heating apparatus comprising wall means defining a heating chamber, at least one surface waveguide means for producing surface wave energy and disposed in said heating chamber, oscillator means in said apparatus actuable to produce a microwave output at least part of which is coupled to said surface waveguide means, a cover made of dielectric material, said cover being disposed within said heating chamber in a position above and close to said surface waveguide means so as to cover the surface of said surface waveguide means for stabilization of electromagnetic wave characteristics of said surface waveguide means and for preventing soiling of said surface waveguide means, and a support table for an article to be heated disposed adjacent to the upper surface of said cover for supporting an article to be heated thereon, said support table and said waveguide means being relatively movable parallel to the plane of the surface of said support table, and driving means connected with one of said support table and said waveguide means for producing said relative movement.

2. Microwave heating apparatus as claimed in claim 1, wherein said surface waveguide means is stationary and said support table is rotatable.

3. Microwave heating apparatus as claimed in claim 2, wherein said support table is made of dielectric material and is detachably mounted in said heating apparatus.

4. Microwave heating apparatus as claimed in claim 2, wherein said surface waveguide means has a periodic structure and is constituted by at least one element which is made of a metallic conductor material and has a plurality of regularly and serially disposed upward projections between which is defined an effectively straight-line succession of slits, adjacent slits being separated by a distance which is less than one half the free-space wavelength of microwaves produced by said oscillator means.

5. A microwave heating apparatus as claimed in claim 2, wherein said driving means is connected to the periphery of said support table to rotate said support table by a force applied to the periphery thereof.

6. Microwave heating apparatus as claimed in claim 1, wherein support table is stationary and said surface waveguide means is rotatable.

7. Microwave heating apparatus as claimed in claim 6, wherein said surface waveguide means is constituted by a flat circular plate and a peripheral wall element which is made of electrically conductive material and is attached to and extends downwards from the periphery of said circular plate, there being defined on the surface of said plate at least one castelated impedance pattern in which the distance between successive castelate portions is less than one half the free-space wavelength of microwaves produced by said oscillator means.

8. Microwave heating apparatus as claimed in claim 6, wherein said surface wave means comprises a rotatable support plate and at least one metallic conductor element supported on said support plate and defining a plurality of upward projections between which is defined a periodic series of slits at intervals less than one half the free-space wavelength of microwaves produced by said oscillator means.

9. Microwave heating apparatus as claimed in claim 8, wherein said support plate is made of a dielectric material.

10. A microwave heating apparatus as claimed in claim 6, further comprising means for rotating said surface waveguide means by an air-draft.

11. A microwave heating apparatus as claimed in claim 10, further comprising means for supplying cooling air for cooling said oscillator means, and air directing means for directing said cooling air against said surface waveguide means for rotating said waveguide means by said cooling air.

12. Microwave heating apparatus as claimed in claim 1, wherein said support table is reciprocally movable.

13. Microwave heating apparatus as claimed in claim 12, wherein the direction of said reciprocal movement of said support table is inclined with respect to the line of transmission of microwaves along said surface waveguide means.

14. Microwave heating apparatus as claimed in claim 1, wherein said surface waveguide means has a flat, periodic structure and is constituted by a flat plate of metal conductor material in which there is defined at least one castelated slot having successive castelate portions separated by a distance less than one half the free-space wavelength of microwaves produced by said oscillator means.

15. A microwave heating apparatus as claimed in claim 14, wherein said periodic structure is formed by an aperture punched in said flat metal plate.

16. Microwave heating apparatus as claimed in claim 1, wherein said support table is made of a dielectric material and further comprising a detachably mounted roller assembly between said support table and said cover.

17. In a microwave heating apparatus comprising wall means defining a heating chamber, at least one surface waveguide means for production of surface wave energy and disposed in said heating chamber, oscillator means in said apparatus actuable to produce a microwave output at least part of which is coupled to said surface waveguide means, and a horizontally disposed support means for support of an article to be heated, said support means being positioned in the vicinity of said surface waveguide means, a microwave heating apparatus which includes a cover made of dielectric material and provided between said support means and said surface waveguide means, at least one of said support means and said surface waveguide means being freely rotatable and said surface waveguide means having a plurality of periodic structures disposed asymmetrically with respect to the center of rotation of said freely rotatable means, the periodicity of said periodic structures forming an exponential energy distribution in a plane perpendicular to the direction of periodicity of said periodic structures.

18. Microwave heating apparatus as claimed in claim 17, in which said surface waveguide means includes a plurality of periodic structures disposed asymmetrically with respect to the center of rotation of said freely rotatable means of said apparatus.

19. Microwave heating apparatus as claimed in claim 17, wherein said surface waveguide means has a periodic structure defined by a flat plate of electrically conductive material having defined thereon at least one castelated impedance pattern having adjacent castelate portions separated by a distance less than one half the free-space wavelength of microwaves produced by said oscillator means, and which includes a tubular waveguide means which is coupled to said oscillator means, and extends along a lower portion of said heating apparatus, and into which projects a metallic conductor element which is fixedly attached to said surface waveguide means.

20. Microwave heating apparatus as claimed in claim 17, in which said surface waveguide means is rotatable, and said oscillator means has associated therewith an output antenna having an axis coincident with the rotary axis of said surface waveguide means.

21. Microwave heating apparatus as claimed in claim 17, in which said wall means constituting the bottom of said heating chamber has a radiation opening through which microwave energy may be radiated, and which further includes a tubular waveguide which transmits output from said oscillator means to and through said radiation opening and said surface waveguide means being provided above said radiation opening.

* * * * *